United States Patent
Grigsby et al.

(10) Patent No.: US 8,400,507 B2
(45) Date of Patent: Mar. 19, 2013

(54) SCENE SELECTION IN A VEHICLE-TO-VEHICLE NETWORK

(75) Inventors: Travis M. Grigsby, Austin, TX (US);
Steven Michael Miller, Cary, NC (US);
Pamela Ann Nesbitt, Tampa, FL (US);
Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 12/049,489

(22) Filed: Mar. 17, 2008

(65) Prior Publication Data
US 2009/0231433 A1 Sep. 17, 2009

(51) Int. Cl.
*H04N 7/18* (2006.01)
(52) U.S. Cl. .......................... 348/149; 348/159
(58) Field of Classification Search .................. 348/149, 348/159
See application file for complete search history.

(56) References Cited

U.S. PATENT DOCUMENTS

| | | | |
|---|---|---|---|
| 5,621,645 A | 4/1997 | Brady | |
| 5,825,283 A | 10/1998 | Camhi | |
| 6,049,756 A | 4/2000 | Libby | |
| 6,208,270 B1 | 3/2001 | Dunn | |
| 6,211,907 B1 * | 4/2001 | Scaman et al. | 348/148 |
| 6,593,960 B1 | 7/2003 | Sugimoto et al. | |
| 6,608,559 B1 | 8/2003 | Lemelson et al. | |
| 6,734,787 B2 | 5/2004 | Ikeda | |
| 6,871,971 B2 | 3/2005 | Morrison | |
| 6,965,604 B1 | 11/2005 | Sato et al. | |
| 7,034,668 B2 | 4/2006 | Engelman et al. | |
| 7,100,190 B2 | 8/2006 | Johnson et al. | |
| 7,174,402 B2 | 2/2007 | Ellerbrock et al. | |
| 7,193,645 B1 * | 3/2007 | Aagaard et al. | 348/211.3 |
| 7,227,493 B2 | 6/2007 | Oswald et al. | |
| 7,248,968 B2 | 7/2007 | Reid | |
| 7,463,138 B2 | 12/2008 | Pawlicki et al. | |
| 7,477,758 B2 | 1/2009 | Piirainen et al. | |
| 7,501,934 B2 | 3/2009 | Tischer | |
| 7,813,822 B1 | 10/2010 | Hoffberg | |
| 7,938,727 B1 | 5/2011 | Konkle | |
| 8,117,281 B2 | 2/2012 | Robinson et al. | |
| 2002/0164962 A1 | 11/2002 | Mankins et al. | |
| 2003/0023974 A1 * | 1/2003 | Dagtas et al. | 725/47 |
| 2003/0210806 A1 * | 11/2003 | Yoichi et al. | 382/104 |

(Continued)

OTHER PUBLICATIONS

Tracy Staedter, "Hello, from the car in front", Jun. 12, 2007, from http://www.abc.net.au/science/news/stories/2007/194084.htm.

(Continued)

*Primary Examiner* — Andy Rao
*Assistant Examiner* — Ebrahim Golabbakhsh
(74) *Attorney, Agent, or Firm* — Jordan IP Law, LLC

(57) ABSTRACT

In V2V or other networks in which multiple video feeds are available to a participant, a participant can select a particular video feed for display. The participant has the option of selecting or locking onto a particular camera so that the display continues to show scenes captured by that camera without regard to what appears in those scenes. As an alternative, the participant may select or lock onto a particular scene. If a scene is selected, the current video feed is analyzed to identify key features. The video feed is monitored. If the key features disappear from the video feed, video feeds available from other cameras are analyzed for the presence of the key features. A new video feed (i.e., camera) is selected from the set of video feeds currently generating images including the key features.

20 Claims, 9 Drawing Sheets

U.S. PATENT DOCUMENTS

| | | | |
|---|---|---|---|
| 2004/0022416 A1 | 2/2004 | Lemelson et al. | |
| 2004/0036622 A1 | 2/2004 | Dukach et al. | |
| 2005/0004753 A1 | 1/2005 | Weiland et al. | |
| 2005/0010955 A1 | 1/2005 | Elia et al. | |
| 2005/0031169 A1 | 2/2005 | Shulman et al. | |
| 2005/0102374 A1 | 5/2005 | Moragne et al. | |
| 2005/0185823 A1* | 8/2005 | Brown et al. | 382/103 |
| 2005/0225634 A1* | 10/2005 | Brunetti et al. | 348/143 |
| 2005/0278088 A1 | 12/2005 | Thorner | |
| 2006/0187305 A1 | 8/2006 | Trivedi et al. | |
| 2007/0052856 A1 | 3/2007 | Jung et al. | |
| 2007/0139523 A1* | 6/2007 | Nishida et al. | 348/148 |
| 2007/0174467 A1 | 7/2007 | Ballou et al. | |
| 2008/0088706 A1* | 4/2008 | Girgensohn et al. | 348/207.99 |
| 2008/0181132 A1 | 7/2008 | Underhill et al. | |
| 2008/0199050 A1 | 8/2008 | Koitabashi | |
| 2008/0211907 A1* | 9/2008 | Kelly et al. | 348/143 |
| 2008/0242221 A1 | 10/2008 | Shapiro et al. | |
| 2009/0023446 A1 | 1/2009 | Das | |
| 2009/0041300 A1 | 2/2009 | Mack | |
| 2009/0063419 A1 | 3/2009 | Nurminen et al. | |
| 2009/0092183 A1 | 4/2009 | O'Hern | |
| 2009/0096937 A1 | 4/2009 | Bauer et al. | |
| 2009/0122740 A1 | 5/2009 | Bouazizi | |
| 2009/0226001 A1 | 9/2009 | Grigsby et al. | |
| 2009/0282164 A1 | 11/2009 | Fuehrer et al. | |
| 2010/0175086 A1 | 7/2010 | Gaydou et al. | |
| 2010/0321183 A1 | 12/2010 | Donovan et al. | |

OTHER PUBLICATIONS

Author Unknown, "Dedicated Short Range Communications", from http://en.wikipedia.org/wiki/Dedicated_Short_Range_Communications.

Final Office Action for U.S. Appl. No. 12/049,471, mailed Jun. 15, 2012, 17 pages, U.S. Patent and Trademark Office.

Non-Final Office Action for U.S. Appl. No. 12/049,436, mailed Nov. 18, 2011, 11 pages, U.S. Patent and Trademark Office.

Non-Final Office Action for U.S. Appl. No. 12/049,451, mailed Apr. 18, 2012, 20 pages, U.S. Patent and Trademark Office.

Non-Final Office Action for U.S. Appl. No. 12/049,471, mailed Oct. 7, 2011, 11 pages, U.S. Patent and Trademark Office.

* cited by examiner time = t0 time = t1 time = t2

SCENE SELECTION IN A VEHICLE-TO-VEHICLE NETWORK

CROSS-REFERENCES TO RELATED APPLICATIONS

This application is related to U.S. patent application 12/049,436 filed concurrently herewith, to U.S. patent application 12/049,451 filed concurrently herewith, to U.S. patent application 12/049,458 filed concurrently herewith, and to U.S. patent application 12/049,471 filed concurrently herewith.

BACKGROUND OF THE INVENTION

The present invention relates to vehicle-to-vehicle (V2V) networks and more particularly to selection of a scene for persisted presentation on a display used by a participant in such networks.

Efforts have been underway for some time to establish standards for and to develop technology that would allow drivers within limited geographic areas to "talk" to each other by participating in ad hoc vehicle-to-vehicle networks in which audio, video and other data is shared among participating vehicles. It is envisioned that each vehicle participating in such a vehicle-to-vehicle network would be equipped with video cameras for capturing video data both for use within the participating vehicle and for sharing with other vehicles participating in the network as well as microphones for capturing audio data that could be shared directly with other vehicles independently of existing communications networks, such as cellular telephone networks.

According to one proposal, data would be shared among vehicles using a Dedicated Short Range Communications (DSRC) wireless protocol operating in the 5.9 Gigahertz band that would support direct vehicle-to-vehicle communications over a relatively short range (100 meters-300 meters). The effective size of the network implemented using the DSRC would be significantly greater than the direct vehicle-to-vehicle maximum range, however, since each vehicle could relay data received from another vehicle to still other vehicles within its range. Relayed data could "hop" one vehicle at the time to vehicles progressively further away from the vehicle that was the source of the data.

Vehicle-to-vehicle networks will serve the general purpose of making participating drivers more aware of what is happening around them. Such networks would permit drivers to alert other drivers of traffic slowdowns, road hazards and approaching emergency vehicles. Such networks could also enable emergency vehicle personnel to alert drivers to their presence, letting alerted drivers anticipate the appearance of the emergency vehicles and more quickly clear paths for them.

While giving a participating driver the chance to select any of the many video feeds that may exist in a vehicle-to-vehicle network at a given time clearly can be useful to the driver, situations will invariably arise in which the driver will want to select and maintain a particular scene, which can present a problem in a vehicle-to-vehicle network. In a "static" video network, the position of a video camera relative to a particular scene is generally fixed so that a single video camera can continue to capture a particular scene for an extended period of time. A vehicle-to-vehicle network isn't static. A video camera capturing a particular scene may be mounted on a vehicle that is moving toward or away from the scene at a high rate of speed.

While the driver interested in the scene can attempt to manually find another camera that is currently showing the scene of interest, there is a concern that a driver will become distracted by having to review available video feeds one at a time until one is found showing the scene of interest and then having to frequently repeat the process as successive video cameras only briefly capture the scene of interest. There is a need to enable a driver to lock onto a particular scene for presentation on a display without having to repeatedly review images captured by different video cameras.

BRIEF SUMMARY OF THE INVENTION

The present invention may be enabled as a method of selecting a video feed from among video feeds produced and shared by multiple video cameras in a network. A first video feed is selected for presentation on a video display. The first video feed is analyzed to identified identify key features. A second video feed is selected from one of the video cameras producing images that include the identified key features.

The present invention may also be implemented as a computer program product for selecting a video feed from among video feeds produced and shared by multiple video cameras in a network. The computer program product includes a computer usable medium embodying computer usable program code, including code configured to select a first video feed for presentation on a video display, to analyze images generated by the selected first video feed to identify one or more key features, and to select a second video feed from one of the video cameras producing images including the identified key features.

The present invention may also be implemented in a video selection system including first selection logic for selecting a first video feed from one of the video cameras, image analysis logic for analyzing images generated by the first video feed to identify one or more key features and additional selection logic for selecting a second video feed from one of the cameras producing images including the identified key features.

DETAILED DESCRIPTION OF THE INVENTION

Figure 1:
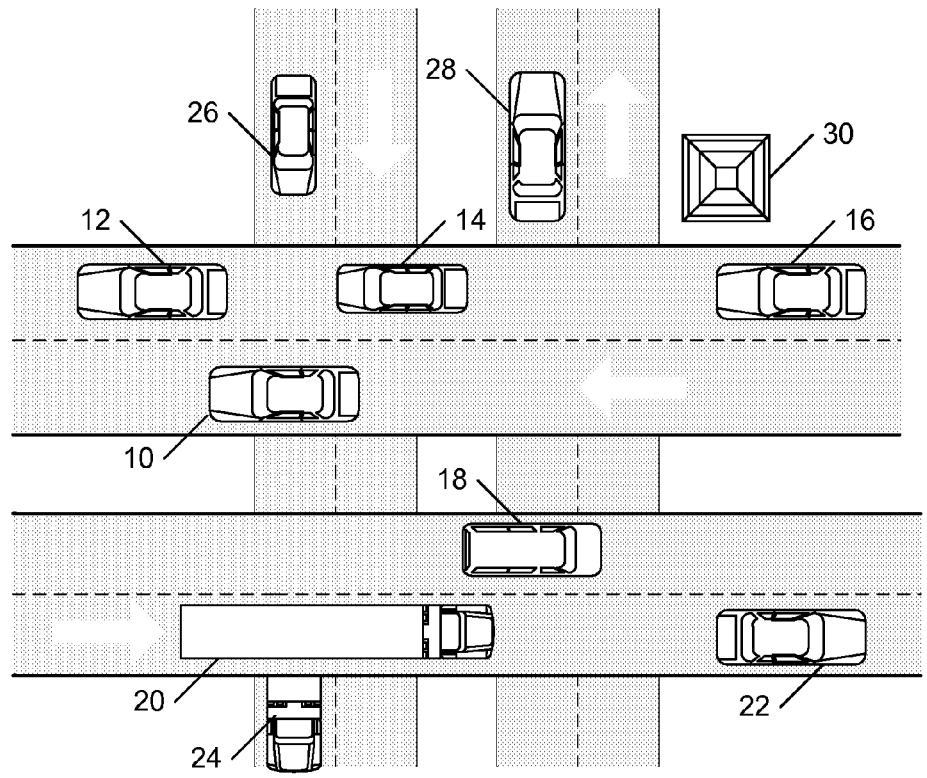
FIG. 1 is an illustration of several roadways traveled by cars and trucks that could participate in a vehicle-to-vehicle network of the type in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1 and assuming that all of the vehicles shown there are properly equipped, any of the vehicles, such as car 10, may elect to participate in an ad hoc vehicle-to-vehicle (V2V) network including not only car 10 but also cars 12, 14, and 16 that are traveling in the same direction as car 10, cars 18 and 22 and tractor-trailer 20 that are traveling in the opposite direction and even cars 26 and 28 and truck 24 that are traveling orthogonally to car 10. Being a participant in a V2V network means that each participating vehicle will be able to share both locally generated and received audio and video data as well as control data with other participating vehicles. Throughout the following description, references will be made to users or drivers of vehicles. References to a vehicle driver or a vehicle user should be construed broadly enough to include all occupants of a vehicle.

As a practical matter, roadside base stations, such as base station 30, may be considered participants in V2V networks by receiving data from and providing data to vehicles in the network even though the base stations obviously do not satisfy any conventional definition of the word "vehicle".

Figure 2:
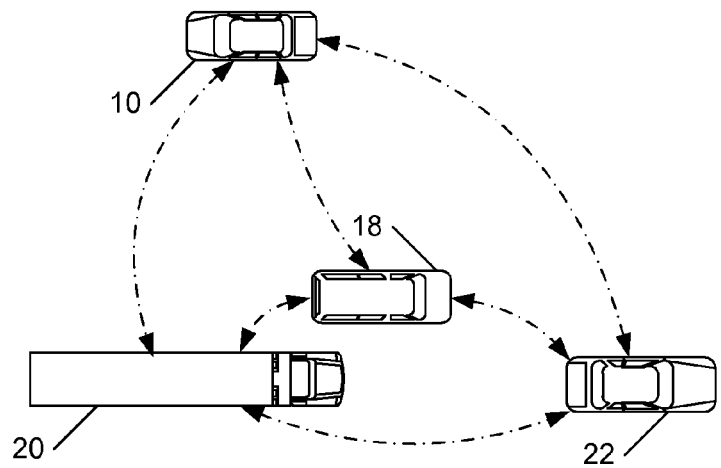
FIG. 2 is an illustration of a few of the cars and trucks that appear in FIG. 1 with additional graphics representing peer-to-peer communication paths among the vehicles.

Referring to FIG. 2, communications among participating vehicles are preferably conducted on a peer-to-peer basis that enables any vehicle in the network to wirelessly communicate directly with any other participating vehicle within a predetermined range determined by the wireless protocol implemented by the network. As noted earlier, the Dedicated Short Range Communications wireless protocol developed for automotive applications has an effective range on the order of 100 to 300 meters, which would be sufficient to enable car 10 to communicate directly with at least cars 18 and 22 and tractor-trailer 20 along with other nearby vehicles (not shown).

The size of the ad hoc network from the perspective of car 10 (or any other participant in the network) is not limited to vehicles with which car 10 may communicate directly. Each participating vehicle can act as a relay point, receiving data from a nearby vehicle and passing it on to other vehicles that are within the direct communication range of the relaying vehicle regardless of whether the target vehicles are beyond the direct communication range of the vehicle from which the data originated. Thus, data can radiate along chains of vehicles, only one or a few of which may be within the direct communication range of the data source.

Figure 3:
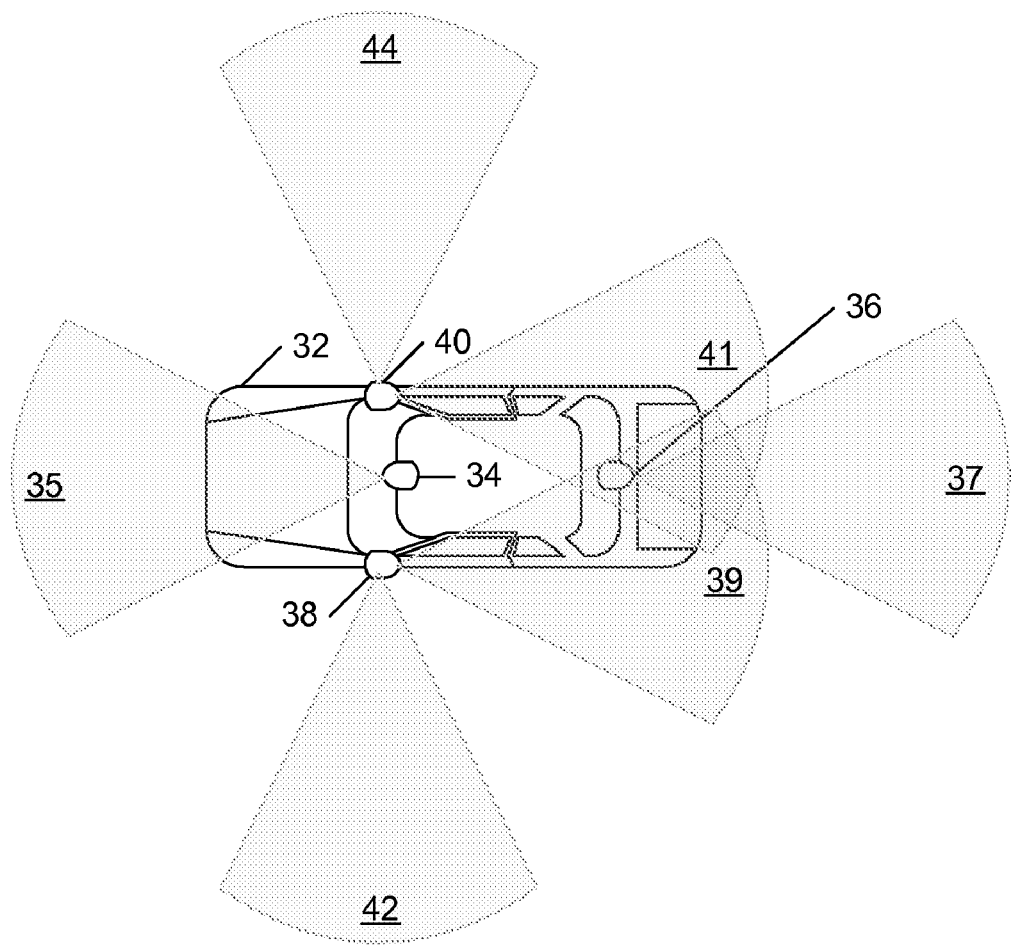
FIG. 3 is an illustration of a single vehicle showing multiple video cameras that could provide video data for use within the vehicle and sharing with other vehicles participating in the vehicle-to-vehicle network.

Referring to FIG. 3, it is assumed that any vehicle that participates in a typical V2V network will have a least one video camera, such as forward-facing video camera 34 that is mounted on or near the interior rearview mirror of vehicle 32 to provide a video field of view 35 that approximates what the driver of vehicle 32 actually sees when seated behind the steering wheel. Video data captured by video camera 34 would probably be more useful to other participating drivers than to the driver of vehicle 32. The vehicle 32 could, of course, be equipped with additional video cameras, such as a rear-facing, trunk-mounted video camera 36 having a field of view 37 directly behind vehicle 40, side-mounted, rear-facing, video cameras 38 and 40 having respective fields of view 39 and 41 that could be used to overcome rearview blind spots that occur when conventional exterior rearview mirrors are used, and even side-facing video cameras (co-located with cameras 38 and 40) that provide separate fields of view 42 and 44 to the left and the right of the vehicle.

Figure 4:
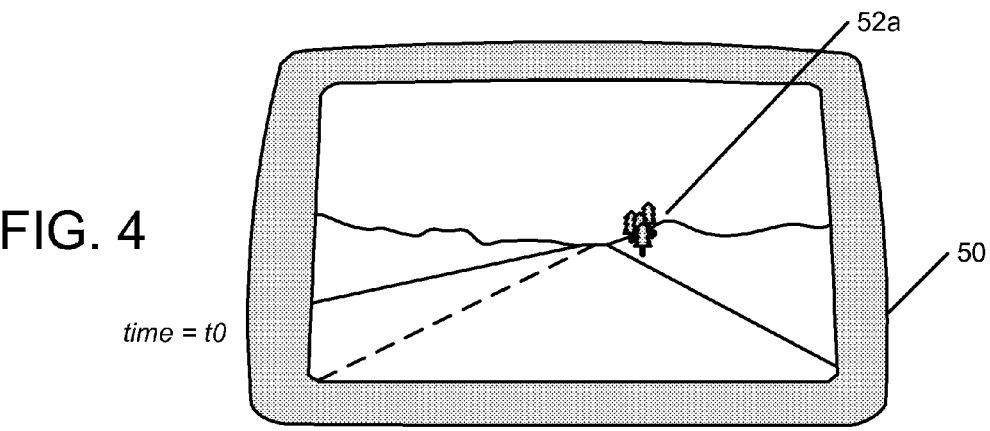
FIGS. 4, 5 and 6 are time-sequenced views of a particular scene assumed to be of possible interest to a participating driver in a vehicle-to-vehicle network.
Figure 5:
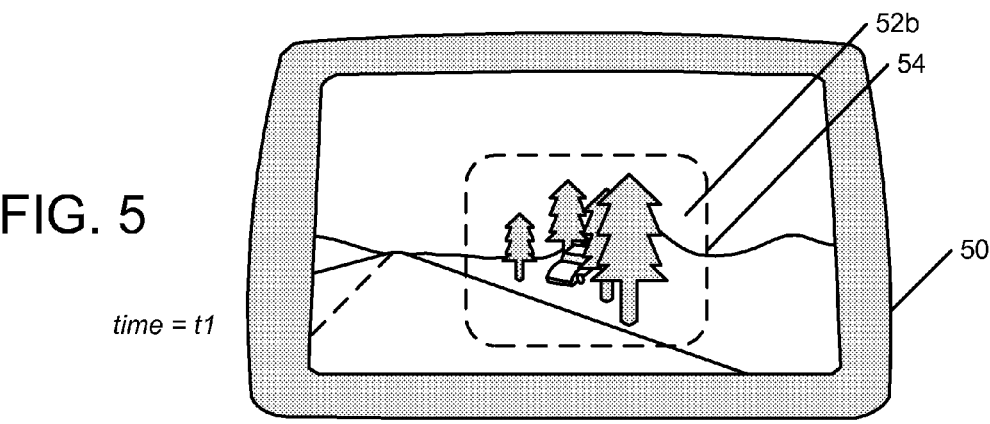
Figure 6:
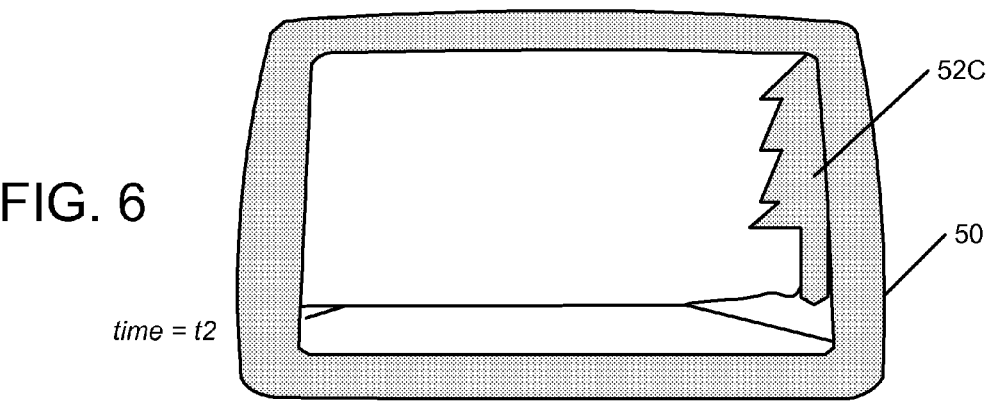

While having a multiplicity of video cameras on the driver's own vehicle and on other participating vehicles in a vehicle-to-vehicle network greatly increases the chance a driver will see a scene that captures the driver's attention, an inherent problem in a vehicle-to-vehicle network is that a camera capturing such a scene will probably only do so briefly. This is illustrated in FIGS. 4, 5 and 6 which shows the same in-vehicle video display 50 at three successive times t0, t1 and t2.

At time t0 (FIG. 4), the vehicle is assumed to be approaching a distant "something" of possible interest at the right edge of the road. For the sake of simplifying the drawings, the "something" is shown as a small grove of trees and no other objects or vehicles are represented in the drawing. At this point, the driver may or may not have any interest in the scene 52a that includes the trees. At time t1 (FIG. 5), the driver has approached the scene closely enough to realize the scene 52b includes not only trees but a previously-hidden automobile of some kind. While the driver might be intensely interested in the briefly-glimpsed automobile at time t2 (FIG. 6), the driver's vehicle may already be nearly past the scene so that all the driver can see is a single tree 52c at one edge of the scene. Since the vehicle might be anything from a police vehicle or a vehicle in distress to a vehicle whose occupants are simply taking a break, the driver of the passing vehicle will be left uncertain how to respond. Obviously, the driver is not likely to respond to a police vehicle sitting alongside the road the same way he might respond to a vehicle in distress.

The present invention enables a driver in a vehicle-to-vehicle network to easily lock onto a scene of interest and to continue to automatically receive images of that scene even after the video camera that initially captured the scene has long since stopped capturing it. Scene locking ordinarily requires a plurality of video data streams (video feeds) from the driver's own vehicle and from other participating vehicles in vehicle-to-vehicle network as well as a data processing system that is capable of receiving, storing and processing various kinds of data feeds (audio, video and other) originating in other vehicles participating in the vehicle-to-vehicle network.

Figure 7:
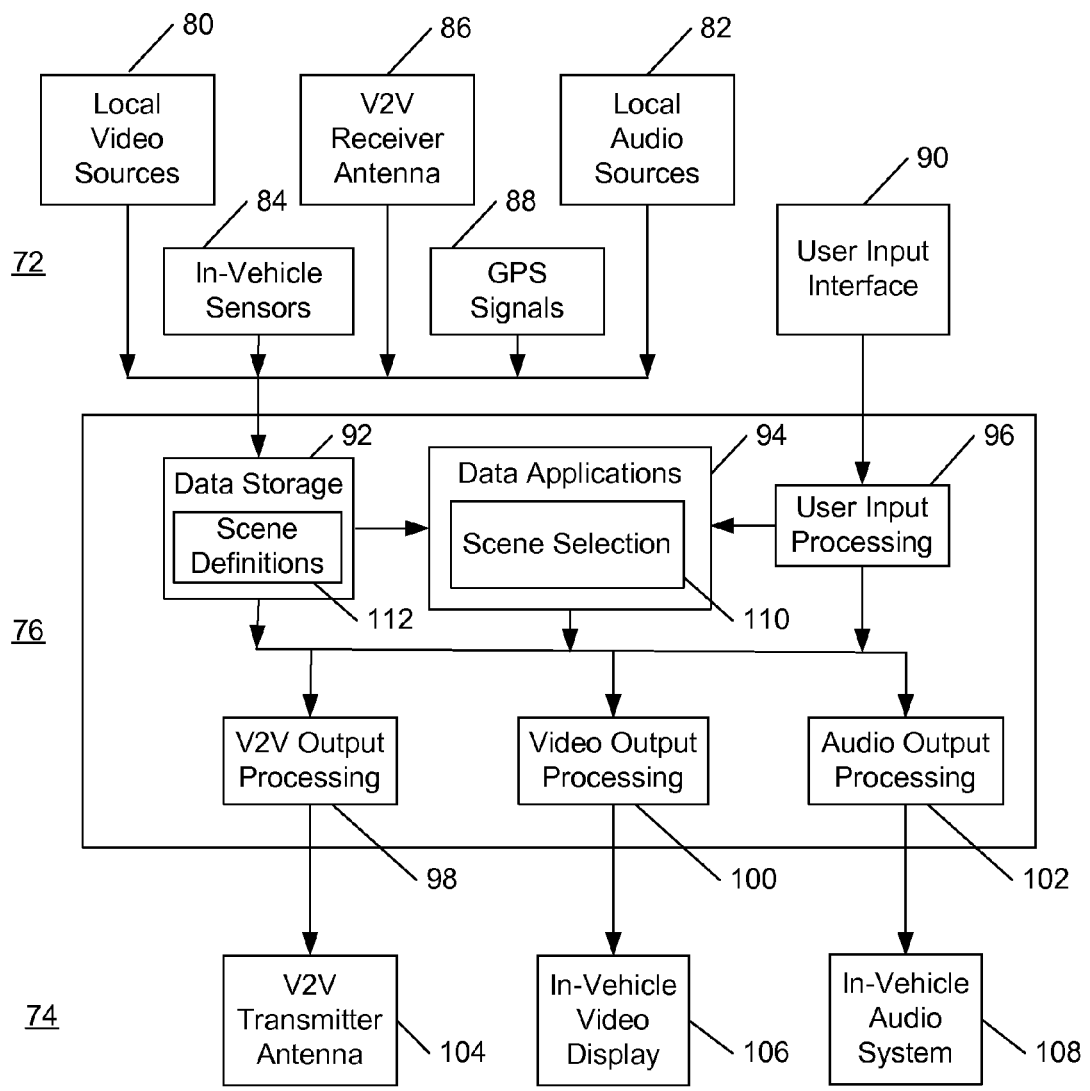
FIG. 7 is the functional block diagram of a system that could be employed to implement the present invention.

FIG. 7 is a functional block diagram of the major functional components for such a data processing system. The data processing system can be roughly divided into three major subsystems: an input subsystem 72, an output subsystem 74, and a data processing subsystem 76 that processes incoming data provided by the input subsystem 72 to provide the output data utilized by the output subsystem 74.

The input subsystem 72 includes local video sources 80 such as vehicle-mounted video cameras of the type already discussed and local audio sources 82, including such sources as dashboard-mounted microphones and wireless headsets for capturing voice input from drivers and/or passengers. Preferably, any wireless headsets would make use of Bluetooth or other standardized wireless protocols. The input subsystem 72 further includes connections to in-vehicle sensors 84, an obvious example of which is the vehicle speedometer, and to a GPS or Global Positioning System subsystem 88 that provides the vehicle's current global location.

The input subsystem 72 further includes a user input interface 90 for acquiring user data and commands. The user input interface can be implemented in a number of known ways. Key input technologies, touchscreen technologies and voice recognition technologies are nonexclusive examples of technologies that can be employed to capture user input.

All of the input subsystems described above can be characterized as local subsystems in that they capture data originating at the vehicle itself. The essence of a V2V network is that each vehicle participating in the network can make use of data provided by other participating vehicles. To make that possible, the input subsystem 72 must include a V2V receiver antenna 86 to acquire audio, video and other data feeds from other vehicles participating in the V2V network.

Input data, both local and remote, is at least initially stored in a data storage subsystem 92 in the data processing subsystem 76. Stored data is retrieved from storage for use by data applications 94 that may be invoked by the vehicle driver or passengers using commands entered at the interface 90 and processed in a user input processing subsystem 96.

Output data resulting from execution of data applications in subsystem 94 may be made available to other participating vehicles through the use of a V2V output processing subsystem 98 connected to a V2V transmitter antenna 104. Depending upon the technologies employed, V2V transmitter antenna 104 and V2V receiver antenna 86 may be the same physical device. Output data may, of course, be used within the vehicle as well. Data intended for an in-vehicle video display 106 undergoes processing in a video output processing stage 100 before being directed to the display. Similarly, data intended for the in-vehicle audio system 108 is processed in an audio output processing stage 102 before being sent to the audio system.

In the illustrated data processing system, the logic for guiding a driver's selection of a particular video feed of interest at a given time resides in a scene selection logic module 110 included in the data applications section 94. Scene definitions (described in more detail later) established by a driver can be stored in a scene definitions storage area 112 in the data storage section 92. The operations enabled by the scene selection logic module 110 will be described in detail below.

A driver configures the scene selection logic by providing a small number of input entries. As discussed earlier, operator inputs can be captured using different technologies, including keyboards or voice commands. In one embodiment of the invention, operator inputs can be captured using a touch screen device 120 of the type illustrated in each of FIGS. 8 through 10. Touch screen device 120 may either be a dedicated input device or, at least in one embodiment, a touch sensitive thin film overlay integrated into the in-vehicle display 50 previously discussed. To simplify the description, the touch screen device 120 will be referred to as if it were a dedicated input device separate and apart from the in-vehicle display 50.

In either an independent or an integrated embodiment, the touch screen device will include display area 122 which can be programmed to display information and to provide programmatic "soft buttons" that can be touched by a user to make input choices. In an integrated embodiment, the thin film overlay would preferably be transparent when not in active use so as not to interfere with the display of selected video. Converting the overlay from an inactive, transparent state to an active state in which selection information is displayed could be performed by a simple operator action such as tapping anywhere on the screen. The overlay could be returned to the inactive transparent state either after a certain period of time elapses without the overlay receiving any operator inputs or by having the operator tap on a specific region of the screen; e.g., the lower left corner.

Figure 8:
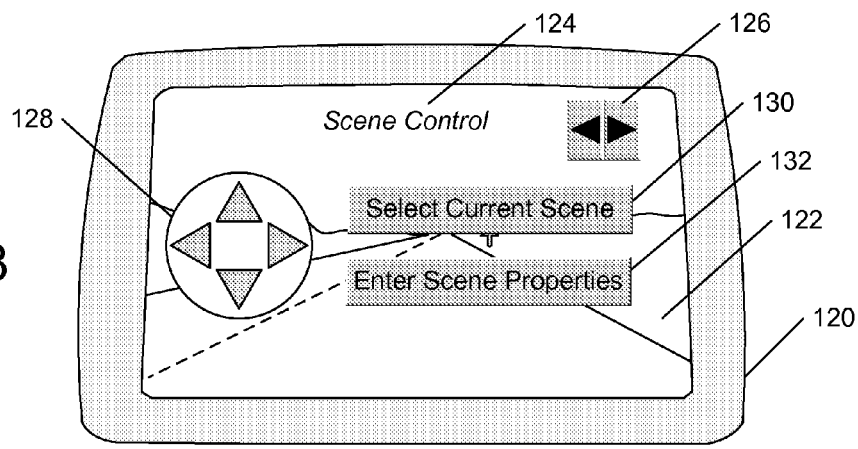
FIG. 8 is an illustration of one embodiment of a user input device showing a top top-level menu.

FIG. 8 is an example of a top level menu for touch screen device 120. The display area 122 includes a header area 124, navigation controls such as spin buttons 126 that appear on all generated menus and programmed "soft" buttons that may differ from one menu to the next. The content of the header area 122 is preferably program-generated text that identifies the major function of the screen. The top-level menu screen may include a rosette device 128 that would allow the driver to quickly select a view direction simply by tapping one of the 4 lobes (front, rear, right, left) of the rosette, a Select Current Scene soft button 130 that would allow the user to select the currently displayed scene with a single tap and an alternative Enter Scene Properties soft button 132 that would allow the user to enter specific properties for the scene that the user wants to see presented on the in-vehicle display.

Figure 9:
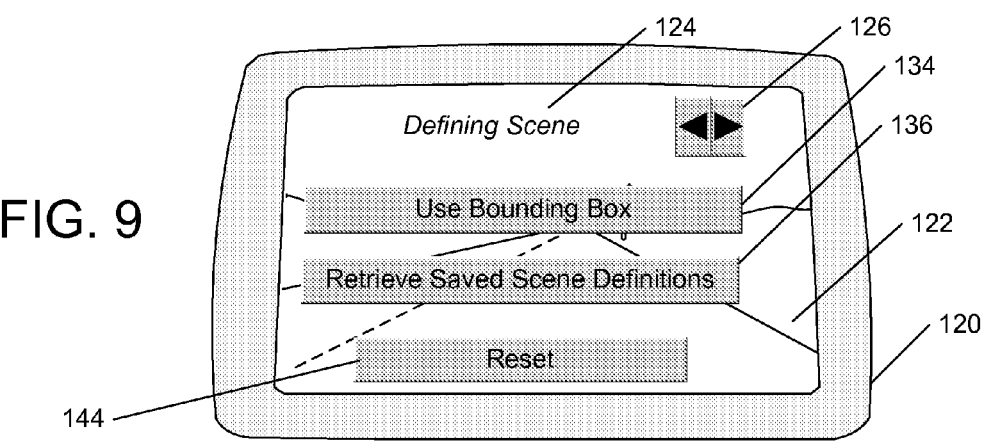
FIG. 9 illustrates the same user input device showing a second level menu.

In one embodiment, mechanisms are employed to reduce the amount of effort required of the user in entering scene properties. The menu illustrated in FIG. 9 shows to examples of mechanisms that may be employed. The menu itself is identified in the header area 124 as a Defining Scene menu and includes two soft selection buttons, a Use Bounding Box soft button 134 and a Retrieve Saved Scene Definition soft button 136. A bounding box is a graphical selection technique that allows a user to specify a particular area on the display screen by drawing a "box" around the area using one of several known techniques. One technique allows the user to create a box surrounding the area to be specified simply by drawing a rough circle around the area on a touch sensitive display. Another known type allows the user to specify the starting and final diagonally-opposite corners of the box by tapping on the screen at diagonally opposite corners of the area to be bounded. Referring momentarily back to FIG. 5, the dotted outline 54 illustrates a bounding box for selecting the grove of trees assumed to be of interest to the vehicle driver.

Because most drivers travel the same roads many times over a given period of time (e.g., a year), it can be expected drivers will be interested in certain scenes almost every time they travel the road. For example, if a commuter must cross the same bridge every day on the way to work, that commuter will definitely have an interest in knowing the condition of traffic is at the bridge long before reaching it. The present invention contemplates allowing the driver to store scene definitions and to recall those definitions from storage as a shortcut to setting up the display of current video presentations of the defined scene. In one embodiment, saved screen definitions would be listed on the display once selected, preferably under an operator-specified or other descriptive name that would allow the user to quickly recognize and select the represented scene.

Figure 10:
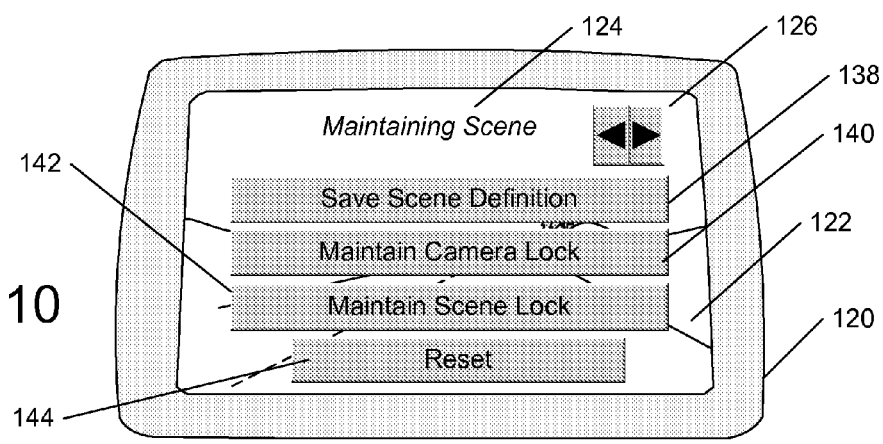
FIG. 10 illustrates the same user input device showing a third level menu.

Once a particular scene has been selected, whether by use of the Select Current Scene button 130, use of a bounding box or use of saved scene definitions, a Maintaining Scene menu such as shown in FIG. 10 will be presented to the user. By selecting Saved Scene Definition soft button 138, the user can opt to save a definition of the currently presented scene before selecting either a Maintain Camera Lock option through the use of soft button 140 or a Maintain Scene Lock option through the use of soft button 142. If the camera lock option is selected, scenes being captured by the currently selected camera will continue to be displayed on the inter-vehicle display whether those scenes change or not. If the scene lock option is selected, the system will automatically switch from one video camera to another in order to continue to present images of the original scene. The operations required to perform scene locking are described below.

Certain screens may also include a Reset soft button 144 that, when selected by the user, will return to the user to a top-level menu. At the top-level menu, the user may select other major functions of the data processing system or may restart the process of selecting a particular scene for display.

Figure 11A:
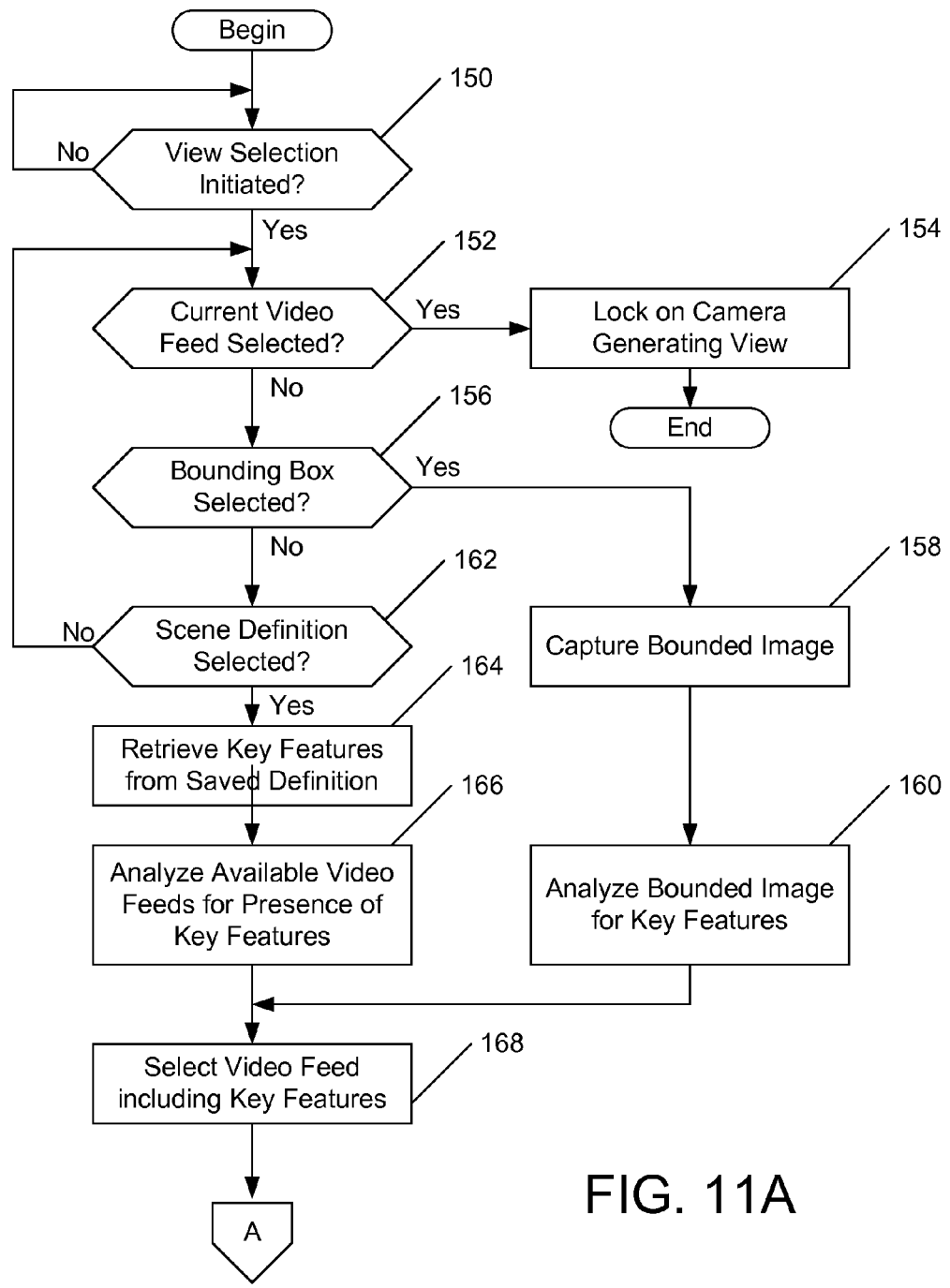
FIG. 11, consisting of FIGS. 11A, 11B, 11C and 11D, is a flow chart of operations occurring in the process for selecting a particular scene for display.
Figure 11B:
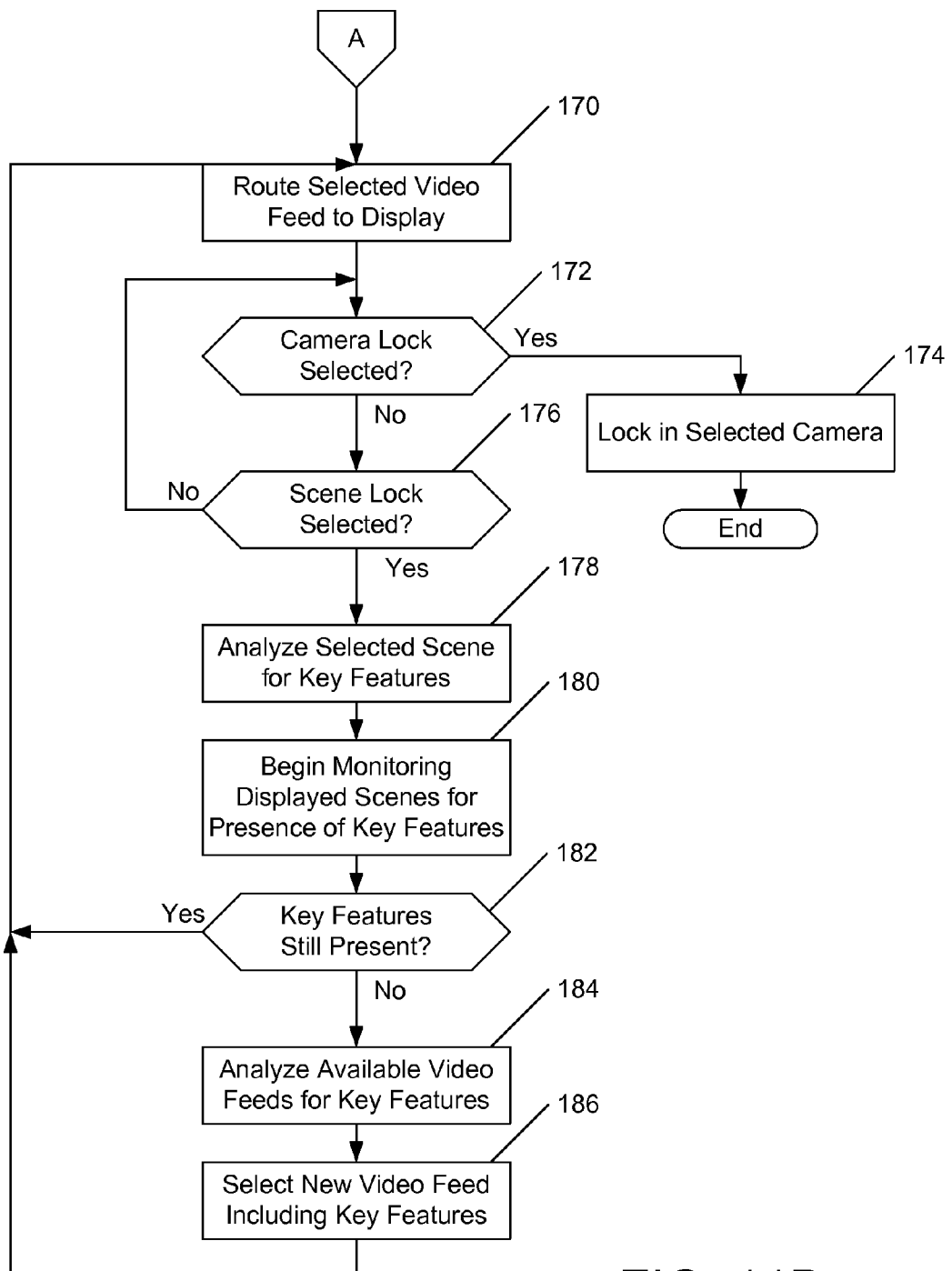
Figure 11C:
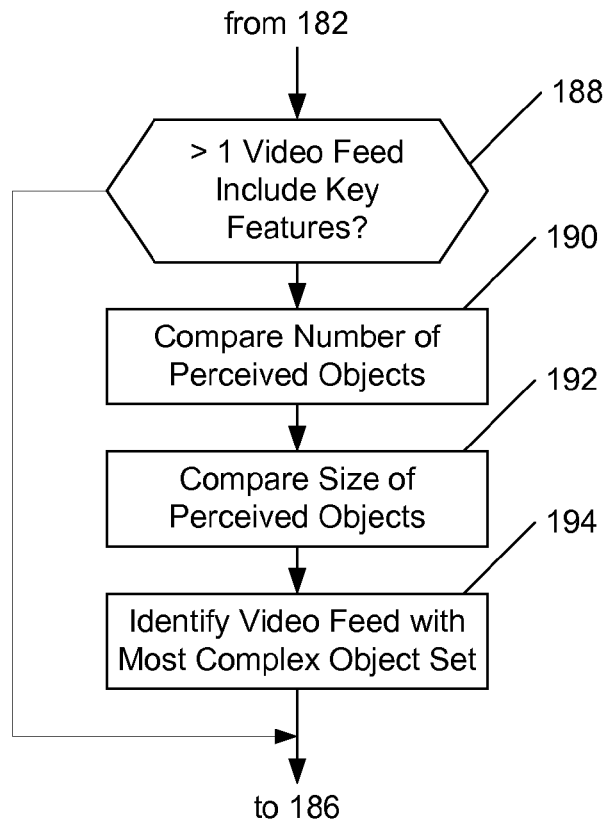

Scene selection and locking operations using the input device 120 are part of a process illustrated in flowchart from in FIG. 11, consisting of FIGS. 11A, 11B and 11C. Referring first to FIG. 11A, because a vehicle-to-vehicle is a multifunction system that may execute a number of different applications using audio and video data, an initial check 150 is performed to determine whether the user has already initialized the system to display images on an in-vehicle display. If the system has already been initialized, a check 152 is made to determine whether the user has already selected the current video feed for presentation on the display. If the user has selected the current video feed, the system locks onto the camera generating that video feed in an operation 154 and scene selection operations are terminated.

As noted earlier, the user may select something other than the currently displayed scene either by using a bounding box or by retrieving saved scene definitions. Operation 156 determines whether the user is making use of a bounding box to select the scene to be displayed. If a bounding box has been selected, an operation 158 is performed to capture the bounded image and the image is analyzed (operation 160) for the presence of key features. Key features can include lines or color transitions that may identify edges or prominent areas of objects. Known algorithms, such as the SIFT (Scale Invariant Feature Transform) or SURF (Speeded Up Robust Features) algorithms, can be employed in identifying key features of an image. Once key features are identified in operation 160, a video feed producing those features is selected in an operation 168. In one embodiment of the invention, the video feed selected in operation 168 would be the same video feed used in the initial bounding box operation.

As an alternative to the bounding box, the user may select (operation 162) a saved scene definition as a mechanism for selecting a current video feed to be displayed. If a saved scene definition is selected, key features included in that definition are retrieved from data storage (operation 164) and the system initiates a process (operation 166) of analyzing currently available video feeds to identify video feeds to produce images including the retrieved key features. Each video feed that does produce images including the retrieved key features is added to a set of candidate video feeds, one of which is selected in the operation 168.

Referring to FIG. 11B, the selected video feed is routed to a display in operation 170. At this point, the system user may elect either of two options, a camera lock option or a scene lock option. If the user selects the camera lock option in operation 172, the system locks on the video camera providing the selected video feed and continues to display scenes captured by that video camera regardless of what may be in those scenes. One situation in which the camera lock option may be preferred by a driver is where the video camera producing the selected video feed is mounted on a vehicle somewhere ahead of the driver's vehicle in heavy traffic. Locking on to the video feed produced by a video camera in the leading vehicle will provide the driver an early warning of potential traffic problems ahead.

If the driver is more interested in continuing to view a particular scene then seeing what a particular camera captures, the driver can select the scene lock option in an operation 176. When that option is selected, the currently-displayed scene is analyzed in an operation 178 to detect the presence of key features and monitoring of the currently-selected video feed is begun (operation 180) to determine whether that video feed is continuing to produce images that include the identified key features. If it is determined in an operation 182 that the currently selected video feed is continuing to produce images that include the identified key features, the scene selection logic enters a loop beginning at operation 170 and ending at operation 182 and remains in that loop until one of two things happens. Either the driver may decide (in operation 172) to lock onto the camera producing the currently-selected images or it may be determined in operation 182 that the currently-selected video feed is no longer generating images that include the key features.

If the latter occurs, the system begins (operation 184) to analyze other available video feeds to identify a set of one or more video feeds that are currently generating images that do include the key features. A new video feed is selected from the identified set and routed to the display in the previously-discussed operation 170. It is possible that the analysis performed in operation 184 will identify a set of two or more video feeds, each of which produces images including the identified key features. In such a situation, a tie-breaking process of the type shown briefly in FIG. 11C may be used. If operation 188 determines that more than one video feed includes the key features, all video feeds in the set are analyzed to determine the number of perceived objects in a scene. The number of objects in scenes produced by different cameras is compared in an operation 190 to determine which scene includes the greatest number of objects. Similarly, the sizes of perceived objects in each scene is determined and compared in an operation 192 to the sizes of perceived objects in other scenes. The video feed containing the most complex set of objects (a combination of the number of objects and the size of those objects) is selected in an operation 194.

Figure 11D:
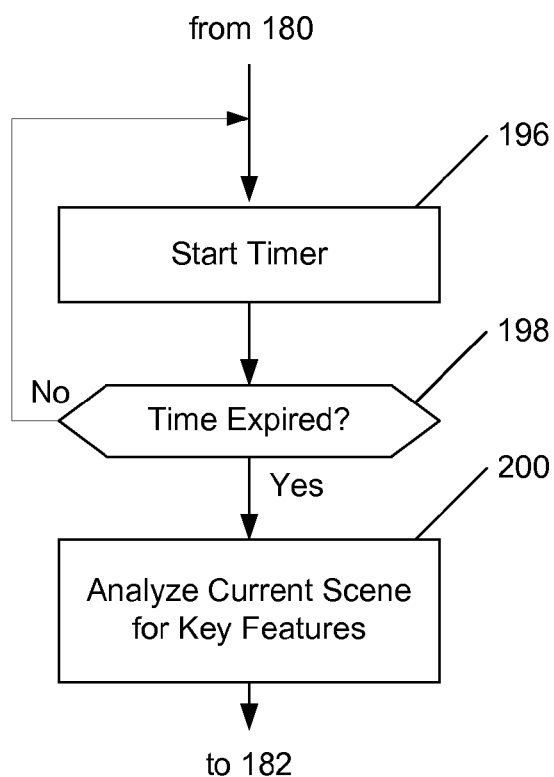
Figure 12:
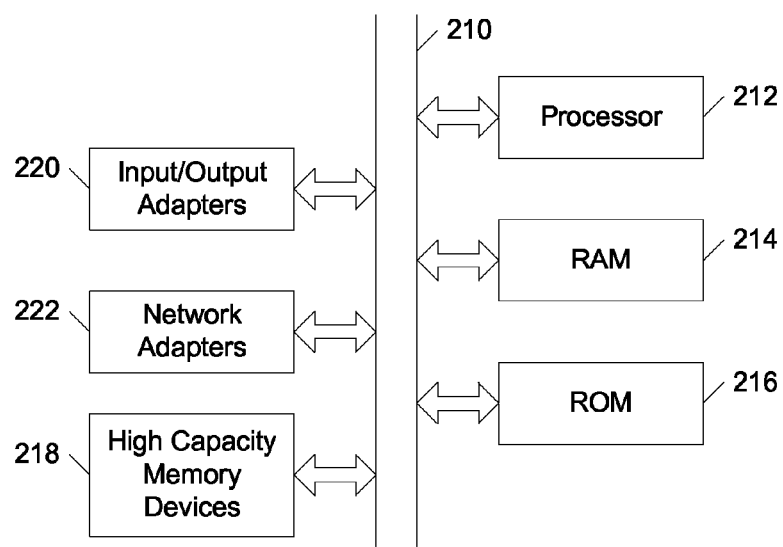
FIG. 12 is a functional block diagram of the hardware infrastructure of a programmable general-purpose computer device that could be used in implementing the present invention.

Referring momentarily back to operation 180 and 182, it is not necessary to analyze every single video frame being displayed for the continued presence of key features. As shown in FIG. 11D, the evaluation would be performed at intervals by starting interval timer (operation 196), determining when the interval expires (operation 198) and then performing an analysis (operation 200) of the currently displayed scene (video frame) to determine whether of the key features are still present in that scene.

The invention may be implemented through the use of special-purpose hardware of the type functionally described earlier. Alternatively, the invention may be implemented by programming a general purpose computer device having an infrastructure of the type illustrated in FIG. 9. The infrastructure includes a system bus 210 that carries information and data among a plurality of hardware subsystems including a processor 212 used to execute program instructions received from computer applications running on the hardware. The infrastructure also includes random access memory (RAM) 214 that provides temporary storage for program instructions and data during execution of computer applications and are read only memory (ROM) 216 often used to store program instructions required for proper operation of the device itself, as opposed to execution of computer applications. Long-term storage of programs and data is provided by high-capacity memory devices 218, such as magnetic hard drives or optical CD or DVD drives.

In a typical computer system, a considerable number of input/output devices are connected to the system bus 210 through input/output adapters to 220. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 222 that are used to connect the system to other computer systems through intervening computer networks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. For example, while the invention has been described for use in a V2V network, it obviously has applicability to other networks where multiple video cameras may share video data; e.g., multi-camera video surveillance systems.

Having thus described the invention of the present application in detail and by reference to preferred embodiments thereof, it will be apparent that modifications and variations are possible without departing from the scope of the invention defined in the appended claims.

What is claimed is:

1. A video selection method for use in a network including a plurality of video cameras producing video feeds that are shared among participants in the network, said method comprising:
    selecting a first video feed from one of said plurality of video cameras for presentation on a video display, wherein each of said plurality of video cameras is mounted on a movable object;
    analyzing images generated by said selected first video feed to identify one or more key features; and
    selecting a second video feed from one of said plurality of video cameras producing images based on the second video feed including said identified key features.

2. The method according to claim 1 wherein selecting a first video feed from one of said plurality of video cameras for presentation on a video display further comprises receiving a user input identifying a particular video feed.

3. The method according to claim 1 wherein selecting a first video feed from one of said plurality of video cameras for presentation on a video display further comprises:
    receiving a user input specifying one or more image properties;
    analyzing images generated by video feeds from at least one of said plurality of video cameras to identify a set of video cameras producing video feeds generating images having the specified image properties;
    selecting the first video feed from said identified set of video cameras.

4. The method according to claim 2 wherein identified key features include the number of apparent objects appearing in an image.

5. The method according to claim 4 wherein identified key features include the size of apparent objects appearing in an image.

6. The method according to claim 1 further comprising:
    determining whether images being presented on the video display continue to include identified key features;
    in response to a determination that images being presented on the video display no longer include identified key features, analyzing one or more other video feeds from other video cameras in said plurality of video cameras to identify a new set of video cameras generating video feeds producing images that currently include said identified key features;
    selecting a new video camera from said new set of video cameras; and
    presenting images produced by the video feed from said selected new video camera on the video display.

7. The method according to claim 6 wherein said video feeds are provided by video cameras in a vehicle-to-vehicle communications network and said video display is included in a vehicle participating in the vehicle-to-vehicle communications network, wherein the movable object is a vehicle, and wherein the vehicle is configured to operate as a relay point to relay information to another vehicle within a direct communication range.

8. The method according to claim 2 further comprising:
    determining whether images being presented on the video display continue to include the identified key features;
    in response to a determination that images being presented on the video display no longer include identified key features, analyzing one or more other video feeds from other video cameras in said plurality of video cameras to identify a new set of video cameras generating video feeds producing images that currently include said identified key features;
    selecting a new video camera from said new set of video cameras; and
    presenting images produced by the video feed from said selected new video camera on the video display.

9. The method according to claim 3 further comprising:
    determining whether images being presented on the video display continue to include the identified key features;
    in response to a determination that images being presented on the video display no longer include identified key features, analyzing one or more other video feeds from other video cameras in said plurality of video cameras to identify a new set of video cameras generating video feeds producing images that currently include said identified key features;
    selecting a new video camera from said new set of video cameras; and
    presenting images produced by the video feed from said selected new video camera on the video display.

10. A computer program product for controlling camera selection in a network including a plurality of video cameras producing video feeds that are shared among participants in the network, said computer program product comprising a non-transitory computer readable medium having computer usable program code embodied therewith, said computer usable program code comprising:
    computer usable program code configured to select a first video feed from one of said plurality of video cameras for presentation on a video display;
    computer usable program code configured to analyze images generated by said selected first video feed to identify one or more key features; and
    computer usable program code configured to select a second video feed from one of said plurality of video cameras producing images based on the second video feed including said identified key features.

11. The computer program product according to claim 10 wherein computer usable program code configured to select a first video feed from one of said plurality of video cameras for presentation on a video display further comprises computer usable program code configured to receive a user input identifying a particular video feed.

12. The computer program product according to claim 10 wherein computer usable program code configured to select a first video feed from one of said plurality of video cameras for presentation on a video display further comprises:
    computer usable program code configured to receive a user input specifying one or more image properties;
    computer usable program code configured to analyze images generated by video feeds from at least one of said plurality of video cameras to identify a set of video cameras producing video feeds generating images having the specified image properties; and
    computer usable program code configured to select the first video feed from said identified set of video cameras.

13. The computer program product according to claim 11 wherein identified key features include the number of apparent objects appearing in an image.

14. The computer program product according to claim 13 wherein identified key features include the size of apparent objects appearing in an image.

15. The computer program product according to claim 10 further comprising:
- computer usable program code configured to determine whether images being presented on the video display continue to include the identified key features;
- computer usable program code configured to, in response to a determination that images being presented on the video display no longer include identified key features, analyze one or more other video feeds from other video cameras in said plurality of video cameras to identify a new set of video cameras generating video feeds producing images that currently include said identified key features;
- computer usable program code configured to select a new video camera from said new set of video cameras; and
- computer usable program code configured to present images produced by the video feed from said selected new video camera on the video display.

16. The computer program product according to claim 15 wherein said video feeds are provided by video cameras in a vehicle-to-vehicle communications network and said video display is included in a vehicle participating in the vehicle-to-vehicle communications network, and wherein the video cameras are to be installed on one or more movable objects.

17. The computer program product according to claim 11 further comprising:
- computer usable program code configured to determine whether images being presented on the video display continue to include the identified key features;
- computer usable program code configured to, in response to a determination that images being presented on the video display no longer include identified key features, analyze one or more other video feeds from other video cameras in said plurality of video cameras to identify a new set of video cameras generating video feeds producing images that currently include said identified key features;
- computer usable program code configured to select a new video camera from said new set of video cameras; and
- computer usable program code configured to present images produced by the video feed from said selected new video camera on the video display.

18. The computer program product according to claim 12 further comprising:
- computer usable program code configured to determine whether images being presented on the video display continue to include the identified key features;
- computer usable program code configured to, in response to a determination that images being presented on the video display no longer include identified key features, analyze one or more other video feeds from other video cameras in said plurality of video cameras to identify a new set of video cameras generating video feeds producing images that currently include said identified key features;
- computer usable program code configured to select a new video camera from said new set of video cameras; and
- computer usable program code configured to present images produced by the video feed from said selected new video camera on the video display.

19. A system for selecting a video feed from a plurality of video feeds that are generated by a plurality of video cameras and shared among participants in a network, said system including:
- first selection logic for selecting a first video feed from one of said plurality of video cameras for presentation on a video display; and
- image analysis logic for analyzing images generated by said selected first video feed to identify one or more key features; and
- second selection logic for selecting a second video feed from one of said plurality of video cameras producing images based on the second video feed including said identified key features.

20. The system according to claim 19 further comprising:
- monitoring logic for determining whether images being presented on the video display continue to include the identified key features;
- logic responsive to a determination that images being presented no longer include the identified key features to analyze one or more video feeds from other video cameras in said plurality of video cameras to identify a new set of video cameras generating video feeds producing images of that currently include said the identified key features; and
- third selection logic for selecting a new video camera from said new set of video cameras.

* * * * *